April 14, 1959  H. R. LYONS  2,882,385
ELECTRIC ARC WELDING
Filed May 27, 1955
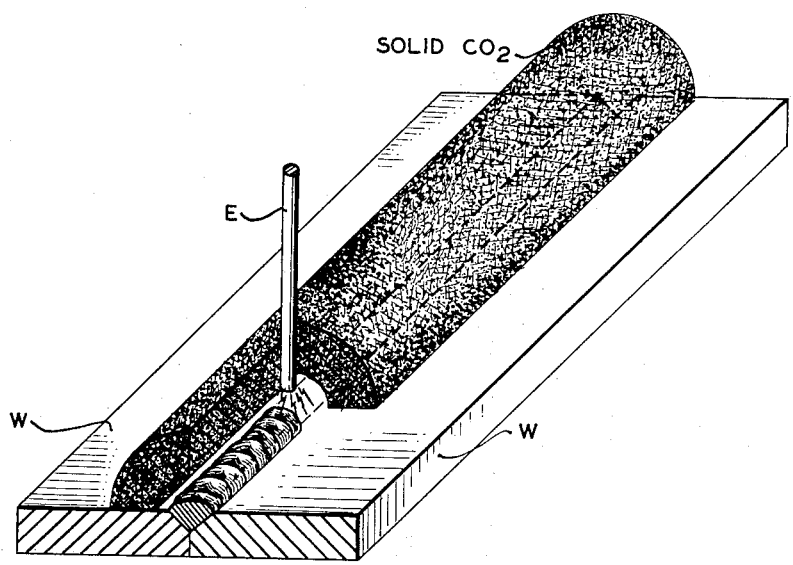
INVENTOR
HAROLD R. LYONS
BY
ATTORNEY & AGENT

United States Patent Office 2,882,385
Patented Apr. 14, 1959

2,882,385

ELECTRIC ARC WELDING

Harold R. Lyons, Short Hills, N.J., assignor to Air Reduction Company, Incorporated, New York, N.Y., a corporation of New York Application May 27, 1955, Serial No. 511,656

1 Claim. (Cl. 219—74)

This application relates to electric arc welding and more particularly to arc welding of the type in which the air is excluded from the arc by a separately supplied shielding medium.

Gas shielded arc welding of both the consuming and non-consuming electrode type is now well known and in many applications it has been proved to have decided advantages over the use of heavily coated electrodes. In the field of consuming electrode welding where the present invention is considered particularly important, the inert gas shielded arc welding process of the Muller et al. Patent No. 2,504,868 has been highly successful. In view of the fact that this process employs monatomic inert gas as a shielding medium, attempts have been made to substitute a less expensive gas for the inert gas. In this connection, carbon dioxide has shown considerable promise if applied to certain selected jobs and if applied under the proper welding conditions.

The object of the present invention is to provide a novel electric arc welding method in which the arc is effectively shielded from the ambient atmosphere by carbon dioxide, and from which certain advantages and economies are derived.

This and other objects and advantages will be pointed out or will become apparent from the following detailed description.

According to the present invention, a bed of solid carbon dioxide, preferably in granular form, is supplied to the joint to be welded and the arc is struck from the electrode to the workpiece within the bed of solid carbon dioxide. As the solid carbon dioxide sublimes in the heat of the arc, an atmosphere of expanding gaseous carbon dioxide is created which effectively excludes air from the weld zone.

The single figure of the drawing illustrates, in its simplest form, a weld being made according to the present invention.

Referring to the drawing, the workpieces to be joined are designated W. In the particular application illustrated the workpieces are bevelled to form a V-joint. A pile of granular solid carbon dioxide is applied to the work to form a mound on the joint and along the plate adjacent the joint in substantially the same way that the pre-fused flux is applied for submerged arc welding. An electrode E is projected through the mound of solid carbon dioxide and an arc is established within the mound of carbon dioxide between the electrode and the workpiece. Relative motion is provided between the electrode and the workpiece in the usual manner to form a weld. Solid carbon dioxide has the peculiar property of sublimation, i.e. it passes directly from the solid state to the gaseous state at atmospheric pressure as it absorbs heat. The volume of the gas is more than 800 times the volume of the solid from which it is produced. Accordingly, as the pile of solid carbon dioxide absorbs heat from the arc the solid in the immediate vicinity of the arc sublimes to form an expanding gaseous carbon dioxide atmosphere which effectively excludes all air from the weld zone. As the weld progresses, the arc forms a hollow around the weld under the mound of solid carbon dioxide and the projecting electrode forms a kerf in the top of the mound approximately as shown in the drawing. This permits the arc to be observed as the weld progresses. Under proper operating conditions, the electrode may never actually make physical contact with any solid carbon dioxide once the arc is started but rather the solid carbon dioxide sublimes in a small radius around the electrode as the weld progresses. Weld spatter which occurs in welding in active gas atmospheres in materially suppressed in this process. Not only is the spatter mechanically caught in the mound of solid carbon dioxide, but it is simultaneously chilled by the −110° F. temperature, so that it does not adhere to the plate. The finished weld comes out with a bright clean surface both on the weld metal itself and the adjacent plate.

The solid carbon dioxide is preferably applied in granular form although this is not necessarily required. Good results have been obtained by piling solid carbon dioxide crushed to a particle size of about 30 mesh on the work to a depth of about 1 inch. Working with a 60° single bevel butt joint with a ⅛" root opening in mild steel plate and with a ⅛" diameter deoxidized steel electrode wire X-ray sound weld metal having a good bead appearance was deposited with 300 ampere direct current reverse polarity and an arc voltage of about 29 volts. The electrode wire burn-off rate was about 280 inches per minute. The residual solid carbon dioxide sublimes at room temperature leaving the plate completely free of any residue therefrom. This coupled with the fact the process is substantially free of spatter and oxide accumulation eliminates the need for the further step of slag removal or other preparation on the finished product or prior to a subsequent pass in multiple pass welds.

It is a decided advantage when welding in a carbon dioxide atmosphere on steel to add residual deoxidizers to the weld metal to prevent the formation of porosity. This can be done as in the test described above by employing an electrode wire having such deoxidizing power. It may also be done by the addition of deoxidizing agents to the weld metal by other means. In the practice of the present invention this can be done by mixing deoxidizers such as aluminum powder with the solid carbon dioxide. Obviously other additions can also be made to the solid carbon dioxide such as alloying additions for the purpose of modifying the mechanical properties to the weld metal, and stabilizing agents for the purpose of modifying the electrical characteristics of the arc.

While the invention has been described above in its most elementary form it obviously is readily adapted to use with more elaborate apparatus. Apparatus similar to that presently available for use with pre-fused silicate type flux is adaptable for use with the present invention. Thus, for manual welding, the granular solid carbon dioxide may be fed from a hopper, preferably insulated, through a tube to discharge on the work around the electrode. For mechanized operations, a more desirable arrangement is to have the solid carbon dioxide discharge from a hopper through a tube which deposits it on the work immediately in front of the electrode. Because of the extremely low temperature of solid carbon dioxide (−110° F.), water vapor in the atmosphere may condense on the carbon dioxide and freeze, bonding the granules into a unitary mass. For this reason, it is preferred to use a screw feed or other agitating device to assist in delivery of the solid carbon dioxide to the work surface. Other modifications include a device to granulate a solid cake of carbon dioxide to feed the product directly to the weld zone. Another variation includes means for expanding liquid carbon dioxide from its compressed state to atmospheric pressure to form in situ solid carbon dioxide in the form of snow. Unlike the submerged arc welding flux it is unnecessary to pick up the unused portion of the flux inasmuch as it sublimes and disappears from the work surface without leaving any residue.

While this invention has been described for use on ferrous workpieces with a ferrous electrode wire, it has some value when used with certain other materials including stainless steel and aluminum. It is also known to have limited usefulness with non-consuming electrodes such as carbon electrodes, although all such electrodes oxidize in this service.

While only one embodiment of the invention has been shown and described in detail herein, it is to be understood that the invention is not limited to the particular form shown but may be used in other ways without departure from its spirit as defined by the following claim.

I claim:

An arc welding method which comprises depositing a mass of granular solid carbon dioxide on a workpiece in the area to be welded, and forming a welding arc within said mass between an electrode projecting into said mass and said workpiece whereby the heat of said arc causes sublimation of a portion of said solid carbon dioxide to form an expanding volume of gaseous carbon dioxide to exclude air from the region of said arc, the remaining solid carbon dioxide acting to arrest and chill molten spatter produced by the welding process to prevent the adherenie thereof to said workpiece.

References Cited in the file of this patent

UNITED STATES PATENTS

| | | |
|---|---|---|
| 2,497,629 | Rieppel | Feb. 14, 1950 |
| 2,544,711 | Mikhalopov | Mar. 13, 1951 |

UNITED STATES PATENT OFFICE
CERTIFICATE OF CORRECTION

Patent No. 2,882,385

April 14, 1959

Harold R. Lyons

It is hereby certified that error appears in the printed specification of the above numbered patent requiring correction and that the said Letters Patent should read as corrected below.

Column 2, line 11, for "in", second occurrence, read -- is --;

column 4, line 12, for "adherenie" read -- adherence --.

Signed and sealed this 28th day of July 1959.

(SEAL)
Attest:

KARL H. AXLINE
Attesting Officer

ROBERT C. WATSON
Commissioner of Patents